(12) United States Patent

Toutant

(10) Patent No.: US 9,073,495 B2
(45) Date of Patent: Jul. 7, 2015

(54) ATTACHMENT CLAMP FOR UTILITY VEHICLE CARGO BOX

(75) Inventor: John T. Toutant, Waupun, WI (US)

(73) Assignee: DEERE & COMPANY, Moline, IL (US)

( * ) Notice: Subject to any disclaimer, the term of this patent is extended or adjusted under 35 U.S.C. 154(b) by 575 days.

(21) Appl. No.: 12/409,188

(22) Filed: Mar. 23, 2009

(65) Prior Publication Data

US 2010/0239383 A1    Sep. 23, 2010

(51) Int. Cl.
*F16B 2/10* (2006.01)
*B60R 13/01* (2006.01)
*B60R 11/00* (2006.01)

(52) U.S. Cl.
CPC . *B60R 13/01* (2013.01); *F16B 2/10* (2013.01); *B60R 11/00* (2013.01); *B60R 2011/0059* (2013.01); *B60R 2011/0073* (2013.01); *B60R 2013/018* (2013.01)

(58) Field of Classification Search
USPC ............... 248/231.51, 231.61, 316.5, 316.6, 248/228.4, 230.4, 230.5; 24/508, 553, 554, 24/557, 565, 170, 498, 515, 516, 517; 269/3, 6, 43, 228, 236
See application file for complete search history.

(56) References Cited

U.S. PATENT DOCUMENTS

| 1,213,392 | A | * | 1/1917 | MaLoney | 24/504 |
| 2,115,579 | A | * | 4/1938 | Hannaford | 384/434 |
| 2,502,804 | A | * | 4/1950 | Spencer | 81/351 |
| 2,837,806 | A | * | 6/1958 | Hawie | 24/328 |
| 3,618,431 | A | * | 11/1971 | Nockleby | 81/329 |
| 3,842,394 | A | * | 10/1974 | Bolduc | 439/261 |
| 4,463,482 | A | * | 8/1984 | Hawie | 24/489 |
| 4,788,723 | A | * | 12/1988 | Doelfel | 2/271 |
| 5,975,618 | A | * | 11/1999 | Rippberger | 296/100.18 |
| 6,622,980 | B2 | * | 9/2003 | Boucher et al. | 248/231.51 |
| 6,964,085 | B2 | * | 11/2005 | Boda | 24/513 |
| 7,624,958 | B2 | * | 12/2009 | Ropertz et al. | 248/231.51 |
| 2004/0168391 | A1 | * | 9/2004 | Yamaura | 52/584.1 |
| 2007/0012833 | A1 | * | 1/2007 | Depay et al. | 248/226.11 |
| 2007/0271745 | A1 | * | 11/2007 | Frey | 24/568 |
| 2009/0032484 | A1 | * | 2/2009 | Hu | 211/70.6 |
| 2010/0108841 | A1 | * | 5/2010 | Kronner et al. | 248/229.13 |

* cited by examiner

*Primary Examiner* — Alfred J Wujciak

(57) ABSTRACT

An attachment clamp for a utility vehicle cargo box with a cylindrical bar along a top surface of the sidewall. The attachment clamp includes an inner plate positioned inside the sidewall, and an outer plate hinged to the inner plate and positioned outside the sidewall. Each of the inner plate and outer plate including a bar gripping element to grip the bar along a top surface of the sidewall. A handle is connected to the plates and pivotable to move the inner and outer plates together to a clamped position around the bar or apart to an unclamped position. The handle may include a lobe that cams the plates together and enters a recess in the outer plate in the clamped position, and a spring urging the inner and outer plates apart toward the unclamped position.

12 Claims, 3 Drawing Sheets

ATTACHMENT CLAMP FOR UTILITY VEHICLE CARGO BOX

FIELD OF THE INVENTION

This invention relates to cargo boxes for off-road utility vehicles used for agricultural, industrial or recreational purposes. More specifically, this invention relates to an attachment clamp for a utility vehicle cargo box.

BACKGROUND OF THE INVENTION

Off-road utility vehicles are often equipped with cargo boxes for carrying various items including tools, supplies, or material. In the past, utility vehicle cargo boxes have been typically constructed of steel panels for sidewalls, with a supporting frame under the floor. Various attachments have been mounted to the steel sidewalls of a utility vehicle cargo box, including racks, tool boxes, load dividers, etc. The attachments can be mounted to the top of the steel sidewalls, for example, using a bolt-on method, or to holes drilled into each wall surface. Hardware and tools are required to mount the attachments to the cargo box wall. An attachment clamp is needed that can be used to mount or relocate attachments on the utility vehicle cargo box without using tools.

Recently, efforts have been made to use composite materials, or other light weight materials such as blow-molded plastics that provide high strength and durability, for utility vehicle cargo boxes. Drilling holes into the sidewalls of a composite utility vehicle cargo box, however, will damage or destroy the sidewalls. It is desirable to mount attachments to a composite utility vehicle cargo box without damaging the sidewalls. Additionally, composite utility vehicle cargo boxes typically have manufacturing tolerances and are subject to thermal expansion. It is desirable to provide an attachment clamp for a composite utility vehicle cargo box that will accommodate manufacturing tolerances and thermal expansion.

SUMMARY OF THE INVENTION

An attachment clamp is provided for a utility vehicle cargo box with a sidewall having a bar on a top surface thereof. The attachment clamp includes an inner plate hinged to an outer plate at the top ends thereof, and gripping portions on the inner and outer plates that move together to grip the bar on the sidewall in a clamped position and extending at least partially under the bar, or apart to release the bar on the sidewall in an unclamped position. A handle is pivotably connected to a rod extending between the inner and outer plates and has a lobe that cams and moves the plates between the clamped and unclamped positions. A recess may be provided in one of the plates, and the lobe on the handle enters the recess to lock the attachment clamp in the clamped position. A coil spring may be positioned between the inner and outer plates.

DESCRIPTION OF THE PREFERRED EMBODIMENT

Figure 1:
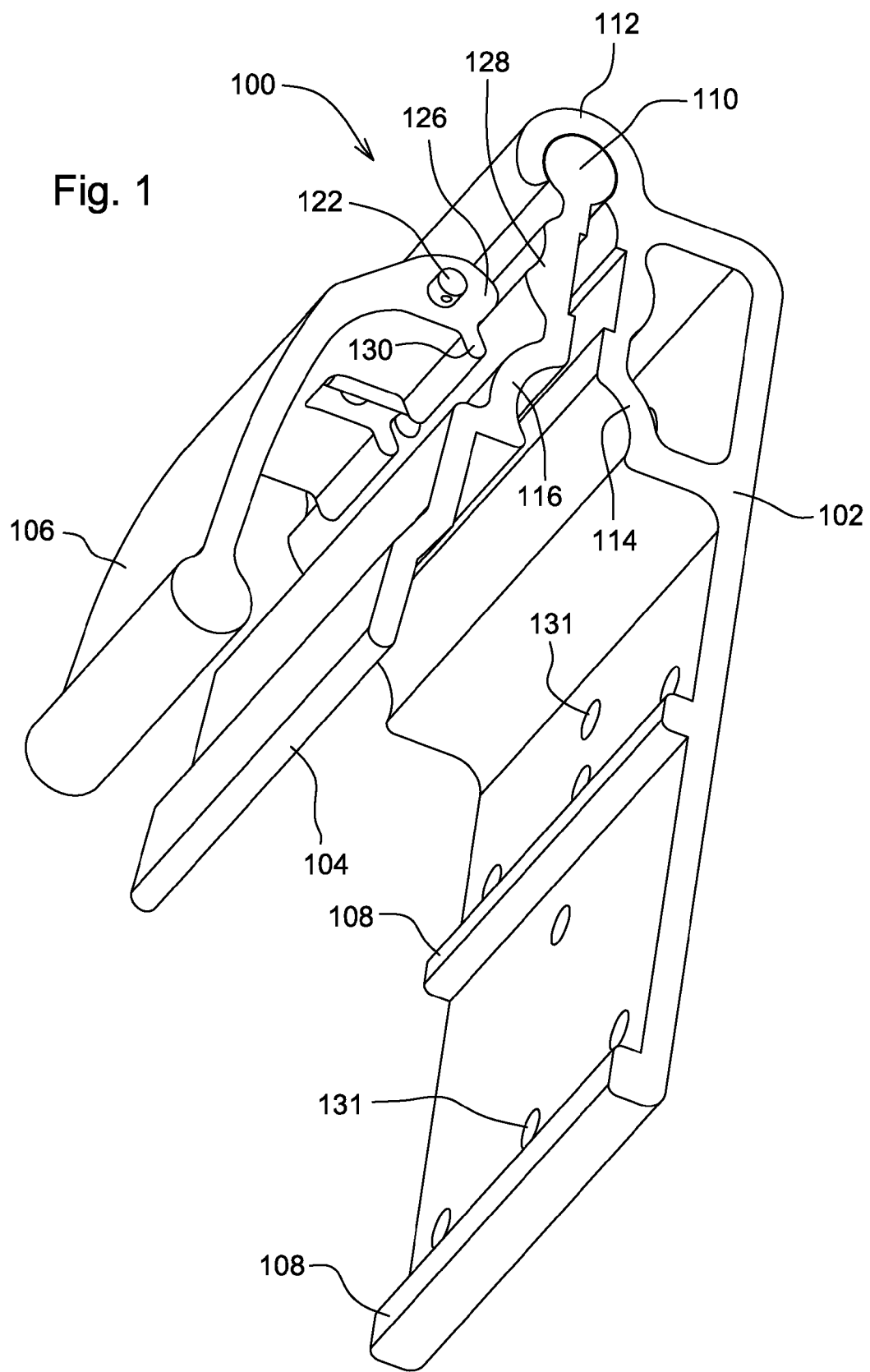
FIG. 1 is a perspective view of an attachment clamp for a utility vehicle cargo box according to a first embodiment of the invention.
Figure 2:
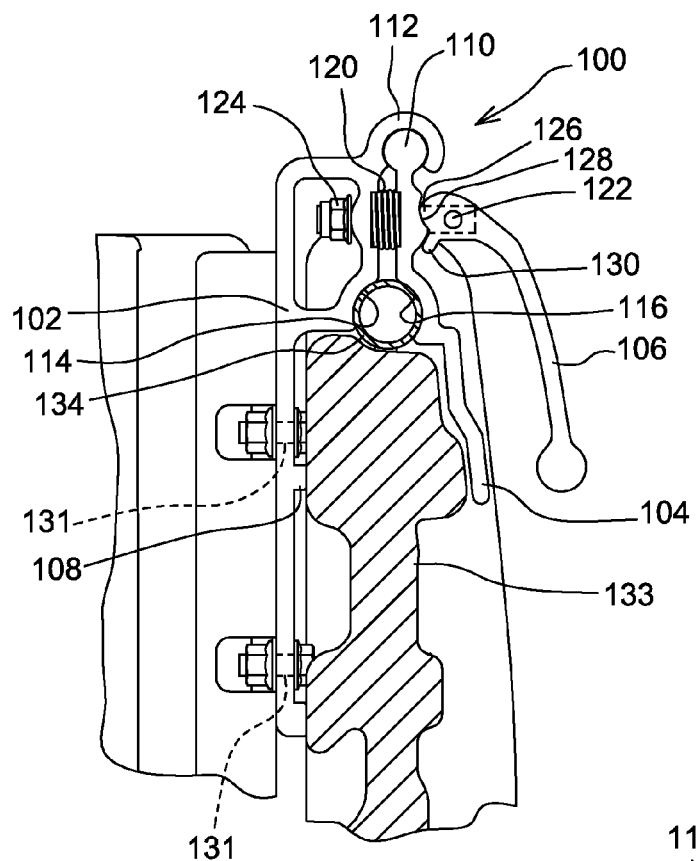
FIG. 2 is a side view in cross section of an attachment clamp according to a first embodiment of the invention in a clamped position on a utility vehicle cargo box.
Figure 3:
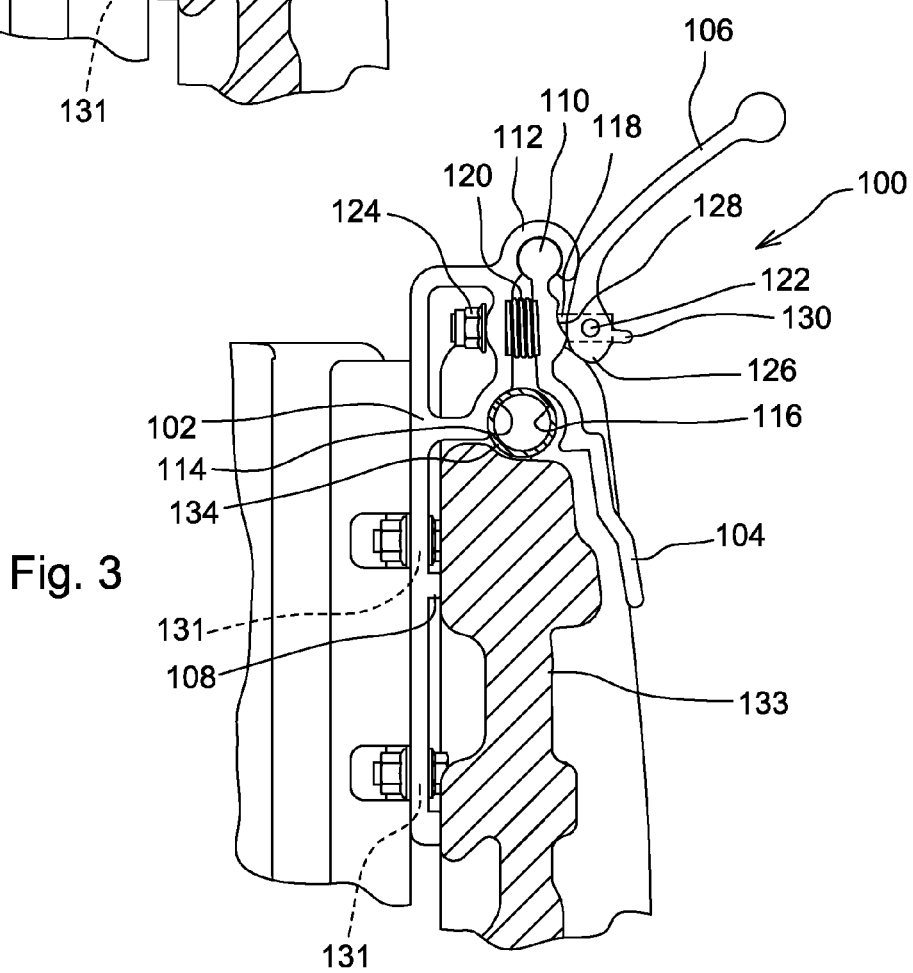
FIG. 3 is a side view in cross section of an attachment clamp according to a first embodiment of the invention in an unclamped position on a utility vehicle cargo box.
Figure 4:
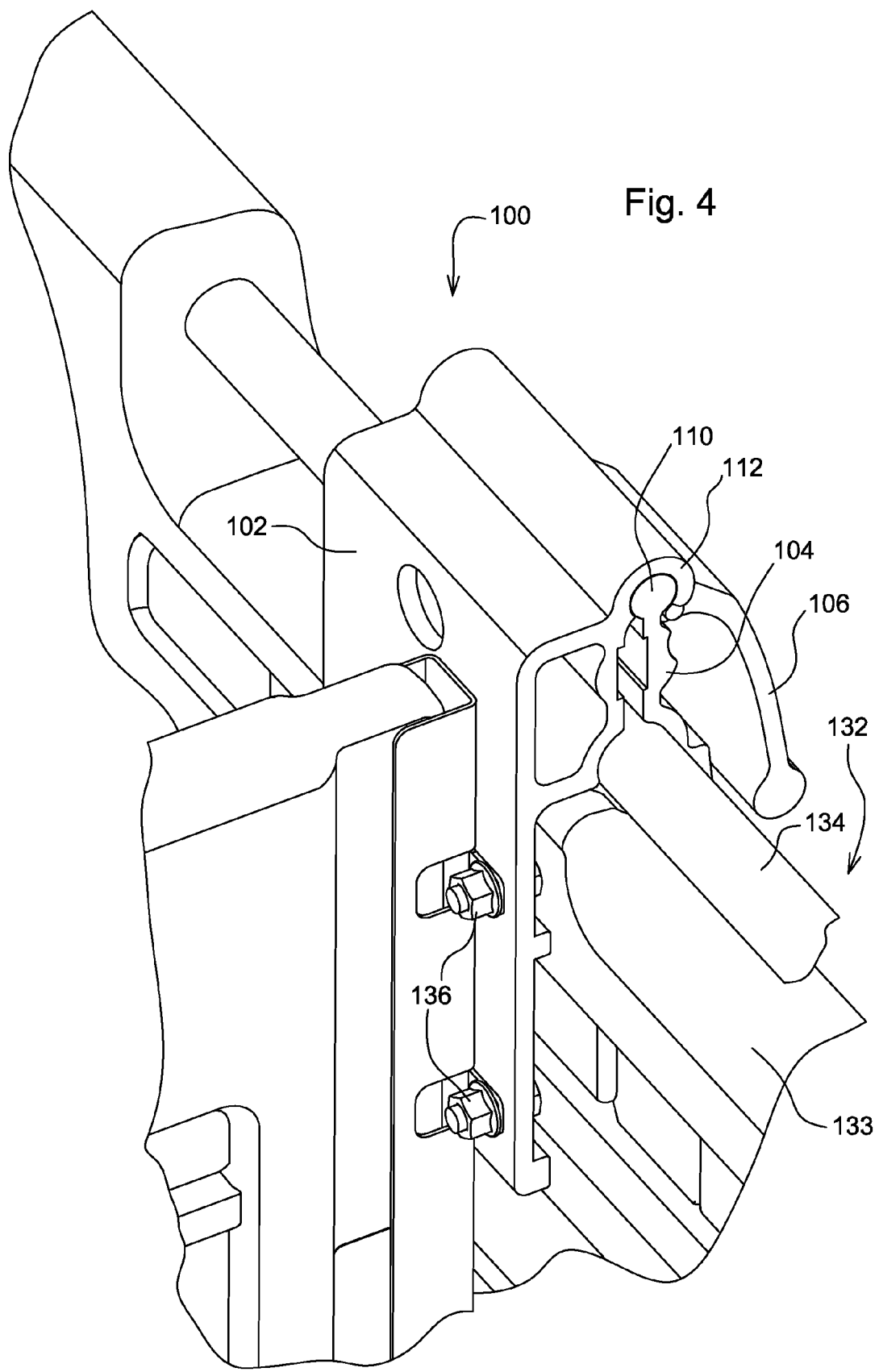
FIG. 4 is a perspective view of a view of a utility vehicle cargo box with attachment clamps in one embodiment of the invention.

In a first embodiment of the invention shown in FIGS. 1-4, attachment clamp 100 includes inner plate 102, outer plate 104, and handle 106. One or more of the components of the attachment clamp may be molded from a composite or plastic material, or may be cast or formed from a metal such as aluminum. Each attachment clamp can releasably grip a bar 134 having a round or cylindrical cross section that extends along the top of cargo box sidewall 133. The bar on the sidewall may be a metal, plastic or composite tube that may have coating, and may have an outer diameter in a range between about ¾ inch and about 1½ inches.

Utility vehicle cargo box 132 may be provided with one or more attachment clamps 100 on each sidewall 133. For example, a pair of attachment clamps may be clamped to bars on opposing sidewalls of a cargo box to secure attachments, such as tool boxes or load dividers, extending across the width of the cargo box. An attachment may be fastened to the attachment clamp with one or more fasteners 136 inserted through holes 131 in the inner plate 102. Ribs 108 on the inner plate 102 between holes 131 may provide sufficient clearance for fasteners 136 between the inner plate and the cargo box side wall.

In one embodiment, cargo box sidewall 133 may be sandwiched between the inner plate 102 and outer plate 104 of attachment clamp 100. The inner plate and outer plate may be pivotally attached to each other using a joint or hinge that preferably is at or adjacent the top of each plate. The inner plate may be positioned against the inner sidewall of the cargo box, and outer plate 104 is positioned against the outer sidewall of the cargo box.

In one embodiment, the hinge mechanism between the inner and outer plates may include a bead member 110 along the top portion of the outer plate, inserted into cap-shaped flange 112 along the top portion of the inner plate. This joint or hinge allows the inner and outer plates of the attachment clamp to pivot toward or away from each other to releasably grip the bar 134 along the top of the cargo box sidewall.

In one embodiment, the inner plate and outer plate each have a gripping portion 114, 116 that can releasably grip bar 134 along the top surface of the cargo box sidewall. In the clamped position, each gripping portion 114, 116 extends around at least about 90 degrees of the bar circumference, and/or both gripping portions together extend sufficiently around and under the bar circumference to capture the bar in the clamped position. In the unclamped position, the gripping portions can release the bar by moving away from the bar sufficiently and/or not extending below the bar circumference.

In one embodiment, handle 106 provides a lever to move the inner and outer plates together or apart and also provides a locking device for the attachment clamp. The handle includes a first lobe 126 that cams against the outer surface of the outer plate to urge the inner and outer plates of the attachment clamp together.

In one embodiment, the handle also may be used to lock the pair of plates in a clamped position gripping the bar, or to separate the plates and move them apart to release the bar in an unclamped position. The handle may be pivotably attached to rod 118 extending through the inner and outer plates. Coil spring 120 may be positioned around rod 118 and between the inner and outer plates. The coil spring may provide a force tending to urge the plates apart and toward the unclamped position, and the spring force provides resistance against moving the plates together into the clamped position.

In one embodiment, pin 122 may pivotally secure handle 106 to a first end of rod 118. Nut 124 may be threaded onto a second end of the rod 118 to provide a stop, and the nut also may be used to vary the spacing of the plates and the compression of the coil spring.

In one embodiment, first lobe 126 on handle 106 extends radially outwardly from the axis defined by pin 122. The first lobe extends radially outwardly from the axis of pin 122 further than the handle's other surfaces near the first lobe. The first lobe 126 is dimensioned so that it cams the pair of plates together as the handle is pivoted downwardly to the clamped position, until the lobe enters recess 128 and the pair of plates move slightly apart as they are locked in the clamped position. Recess 128 may be on the outwardly facing surface of outer plate 104 and may have sloped sides. In the clamped position, the coil spring helps hold or lock the first lobe in the recess.

In one embodiment, handle 106 may include second lobe 130 extending radially from the handle outer surface. The second lobe may contact or abut the outer plate adjacent recess 128 as the attachment clamp reaches the clamped position, and may help maintain the handle 106 in the clamped position.

In one embodiment, the operator may pivot handle to move the attachment clamp from the clamped position to the unclamped position. This is done by pivoting handle 106 upwardly so that first lobe 126 can move out of recess 128. As the first lobe moves out of the recess, the coil spring urges the inner and outer plates apart to release their grip on bar 134. The attachment clamp then may be disengaged from the bar and moved to another position on the bar, or removed from sidewall of the cargo box.

Having described a preferred embodiment, it will become apparent that various modifications can be made without departing from the scope of the invention as defined in the accompanying claims.

The invention claimed is:

1. An attachment clamp for a utility vehicle cargo box sidewall having a cylindrical bar along a top surface thereof, comprising:
   an inner plate positioned inside the sidewall;
   an outer plate hinged to the inner plate at a top portion of the plates and positioned outside the sidewall;
   each of the inner plate and outer plate including a cylindrical bar gripping element adjacent and below the top portion to grip the cylindrical bar along the top surface of the sidewall;
   a handle having a lobe extending radially outwardly therefrom and pivotable to cam the inner and outer plates together and then move the lobe into a recess on an outwardly facing surface of the outer plate to hold the inner and outer plates in a clamped position around the cylindrical bar; and
   a spring urging the inner and outer plates apart toward an unclamped position; and
   at least one fastener engaged to and securing an attachment to the inner plate;
   wherein the cylindrical bar gripping elements of each of the inner and outer plates extend at least about ninety degrees around the bar.

2. The attachment clamp of claim 1 further comprising a plurality of ribs on the inner plate providing clearance between at least part of the inner plate and the cargo box sidewall.

3. An attachment clamp for a utility vehicle cargo box sidewall having a cylindrical bar along a top surface thereof, comprising:
   a pair of plates hinged to each other at a top portion of each plate, with the sidewall between the pair of plates and a spring urging the pair of plates apart;
   each plate having a cylindrical bar gripping element below the top portion of each plate;
   a handle attached to a rod extending through the pair of plates and moving the cylindrical bar gripping elements of both plates between a clamped position gripping the cylindrical bar along the top surface of the sidewall, and an unclamped position releasing the cylindrical bar; and
   a lobe on the handle camming the pair of plates together until the lobe enters a recess in one of the pair of plates in the clamped position.

4. An attachment clamp for a utility vehicle cargo box sidewall having a cylindrical bar along a top surface thereof, comprising:
   a pair of plates hinged to each other at a top portion of each plate, with the sidewall between the pair of plates and a spring urging the pair of plates apart;
   each plate having a cylindrical bar gripping element below the top portion of each plate;
   a handle attached to a rod extending through the pair of plates and including a camming surface moving both plates between a clamped position gripping the cylindrical bar along the top surface of the sidewall, and an unclamped position releasing the cylindrical bar; the camming surface engaging a recess on an outwardly facing surface of one of the plates to lock the plates in the clamped position; and
   an attachment fastened to one of the pair of plates inside the sidewall below the cylindrical bar gripping element.

5. An attachment clamp for a utility vehicle cargo box sidewall having a cylindrical bar along a top surface thereof, comprising:
   a pair of plates hinged to each other, with the sidewall between the pair of plates and a spring urging the pair of plates apart;
   a handle attached to a rod extending through the pair of plates and moving both plates between a clamped position gripping the cylindrical bar along the top surface of the sidewall, and an unclamped position releasing the cylindrical bar; and
   a lobe on the handle camming the pair of plates together until the lobe enters a recess in one of the pair of plates in the clamped position;
   wherein one of the pair of plates includes a bead inserted into a flange on the other plate.

6. An attachment clamp for a utility vehicle cargo box sidewall having a cylindrical bar along a top surface thereof, comprising:
   an inner plate hinged to an outer plate at the top ends thereof;
   cylindrical bar gripping portions adjacent the top ends of the inner and outer plates that move together to grip the cylindrical bar on the sidewall in a clamped position extending at least partially under the bar, or apart to release the bar on the sidewall in an unclamped position;
   a handle connected to a rod extending between the inner and outer plates to move them between the clamped and unclamped positions;
   a coil spring between the inner and outer plates; and
   a recess in one of the plates and a lobe on the handle that enters the recess to lock the attachment clamp in the clamped position.

7. An attachment clamp for a utility vehicle cargo box sidewall having a cylindrical bar along a top surface thereof, comprising:
- an inner plate hinged to an outer plate at the top ends thereof;
- cylindrical bar gripping portions adjacent the top ends of on the inner and outer plates that move together to grip the cylindrical bar on the sidewall in a clamped position extending at least partially under the bar, or apart to release the bar on the sidewall in an unclamped position;
- a handle connected to a rod extending between the inner and outer plates, the handle including a cam surface sliding against one of the plates to move the inner and outer plates closer together and then entering a recess on an outwardly facing surface of one of the plates to lock the inner and outer plates in the clamped position; and
- a coil spring between the inner and outer plates; and
- at least one fastener that secures an attachment to the inner plate.

8. The attachment clamp of claim 7 wherein the handle is pivotably connected to the rod.

9. An attachment clamp for a utility vehicle cargo box sidewall having a cylindrical bar along a top surface thereof, comprising:
- an inner plate positioned inside the sidewall;
- an outer plate hinged to the inner plate at a top end of each plate and positioned outside the sidewall;
- each of the inner plate and outer plate including a cylindrical bar gripping element adjacent the top end to grip the bar along the top surface of the sidewall;
- a spring urging the inner and outer plates apart;
- a handle connected to one of the plates and pivotable to move the inner and outer plates together to a clamped position around the bar or apart to an unclamped position;
- wherein the handle is pivotably attached to a rod extending through the inner and outer plates; and
- wherein the handle includes a lobe that cams the inner and outer plates together until the lobe enters a recess in the outer plate in the clamped position.

10. The attachment clamp of claim 9 wherein the bar gripping elements of each of the inner and outer plates extend at least about ninety degrees around the bar.

11. The attachment clamp of claim 9 further comprising a plurality of ribs on the inner plate providing clearance between at least part of the inner plate and the cargo box sidewall.

12. An attachment clamp for a utility vehicle cargo box sidewall having a cylindrical bar along a top surface thereof, comprising:
- a pair of plates hinged to each other at a top end of each plate, with the sidewall between the pair of plates;
- a handle attached to a rod extending through the pair of plates and having a camming surface moving both plates between a clamped position gripping the cylindrical bar along the top surface of the sidewall, and an unclamped position releasing the cylindrical bar; and
- a coil spring around the rod and between the pair of plates;
- one of the pair of plates having a recess holding the camming surface while the pair of plates are in the clamped position;
- wherein one of the pair of plates includes a bead inserted into a flange on the other plate.

* * * * *